United States Patent Office 2,941,015
Patented June 14, 1960

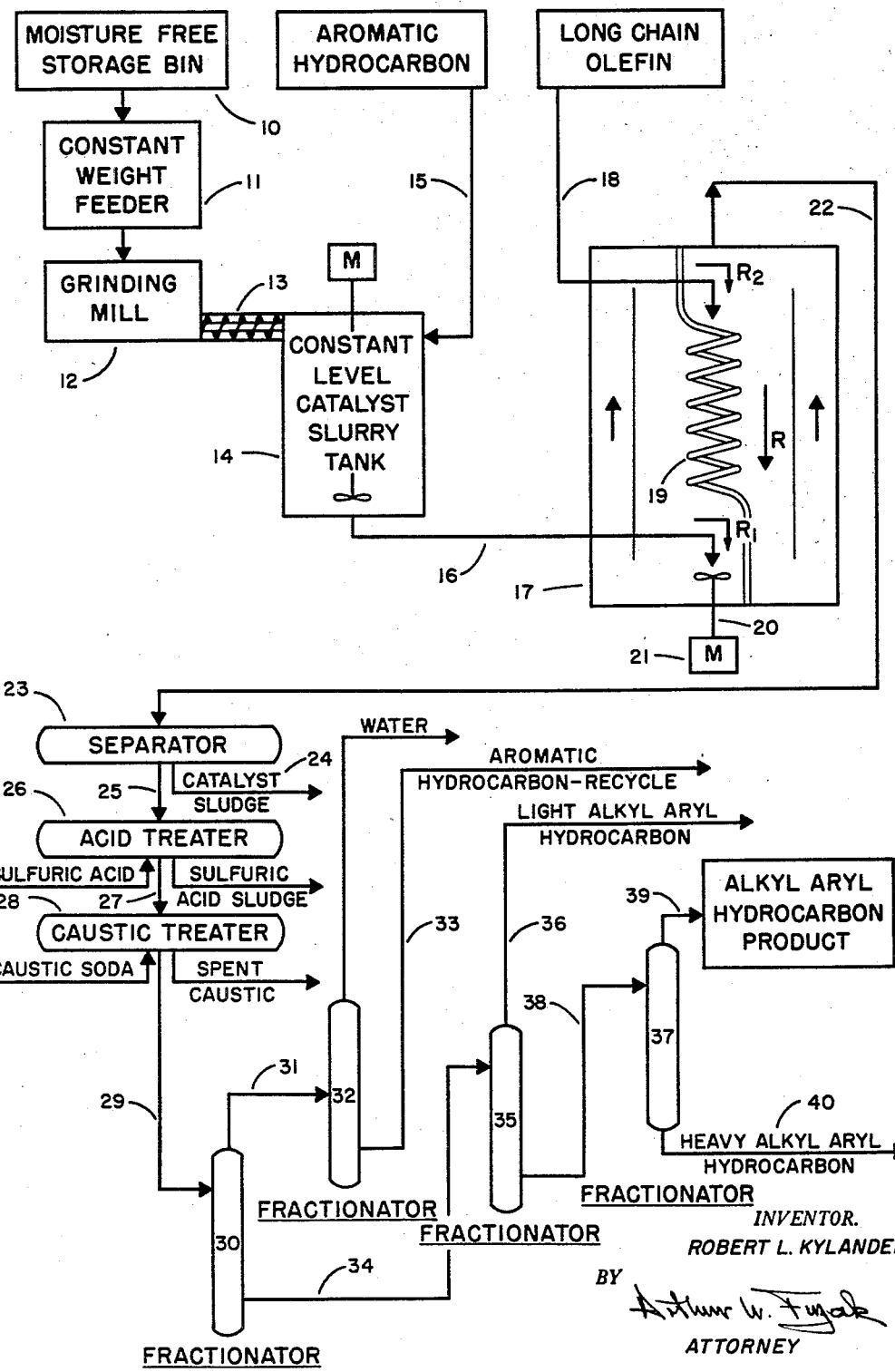

2,941,015

ALKYL ARYL HYDROCARBON PROCESS

Robert L. Kylander, Houston, Tex., assignor to Continental Oil Company, Ponca City, Okla., a corporation of Delaware Filed June 19, 1957, Ser. No. 666,700

7 Claims. (Cl. 260—671)

This invention relates to an improved process for the manufacture of alkyl aryl hydrocarbons and is more particularly concerned with a continuous process for the alkylation of an aromatic hydrocarbon with a long chain olefin to prepare alkyl aryl hydrocarbons useful in subsequent sulfonation processes for the production of superior detergents.

Both batch and continuous dodecylbenzene processes currently known to the art are relatively inefficient as compared with my process because of uncertainty in the success of alkylation, high catalyst and reactant requirements and the production of relatively large quantities of undesired by-products. These disadvantages result from the practical difficulties involved in delivering and maintaining a constant ratio of catalyst to reactants and from failure to maintain proper conditions in the reaction vessel. Heretofore, in the preparation of dodecylbenzene, the absence of appropriate controls during processing ordinarily resulted in the occurrence of numerous side reactions (polymerization and fragmentation of the olefin) to produce undue quantities of alkyl aryl hydrocarbons of molecular weights both lower and higher than the desired product.

The purpose of my invention is, therefore, to produce consistently alkyl aryl hydrocarbons having decreased catalyst and reactant requirements, decreased by-product formation and correspondingly increased product yields.

I have found that these objects of my invention can be attained through adoption of certain critical catalyst-reactant ratios, as well as through adoption of inexpensive control methods of delivery of the very highly hygroscopic aluminum chloride catalyst to the reaction zone. I have also discovered that it is necessary, in order to obtain increased product purity and yield, to introduce all of the reactants, including the catalyst, into the reaction zone continuously and simultaneously, as contrasted with conventional methods in which either the catalyst slurry or the olefin is introduced into the vessel in a single or multiple charge. In addition, a most important further aspect of my invention resides in the discovery that substantial increases in the efficiency of my process can be achieved through control of the ratio of the rate of reactants flow past a heat exchange surface to the rate of introduction of reactants into the reactor vessel.

These concepts, as well as the foregoing and other objects, will be apparent from consideration of the following description as related to the drawing, which is a flow sheet of my process.

In conformance with this invention, coarse aluminum chloride in the form of irregular shaped particles, preferably from approximately 1/8" to 1/2" in size, is stored in a moisture proof bin 10 from which it is delivered by gravity flow to a continuously operating constant weight feeder 11 and then to a grinding mill 12. It is there particulated to not more than 10 mesh in size and delivered, by gravity feed or through the screw conveyor 13, to a constant level catalyst slurry tank 14.

It has been customary, in the use of aluminum chloride as an alkylation catalyst, to obtain and deliver it in the form of granules not larger than 10 mesh in size. Since finely divided aluminum chloride becomes packed in shipping and storage containers, it is not free flowing and therefore is difficult to transfer from storage to the reaction vessel continuously at an accurately controlled rate. Utilization of the above simple variation in method, in which the aluminum chloride is stored, weighed and otherwise handled, just prior to grinding and incorporation in the slurry, in the form of coarse granules which are free flowing, alleviates this problem. The amount of aluminum chloride required to catalyze the reaction has been found to be within the range of 2.5 to 6.0 percent by weight of the olefin used while the preferred quantity is 2.6 percent. Below 2.5 percent, alkylation does not proceed satisfactorily, while above the 6 percent limitation, excessive free oil and by-product formation occurs.

An aromatic hydrocarbon, such as benzene, is continuously introduced, through the flow line 15, to the agitated tank 14 and the resulting slurry is delivered in controlled quantities through pipe 16 to reactor 17. Continuously and concurrently added to the reactor through pipe 18 is the long chain, high molecular weight olefin, dodecene, in this example. The quantities of aromatic and olefin used are such that the mole ratio of aromatic hydrocarbon to olefin is from 3 to 20. Below a mole ratio of 3, product quality and yield decrease rapidly, while above the 20 mole ratio specified, there is no significant increase in either yield or quality while there is an increased aromatic hydrocarbon removal and recovery cost. It is, however, preferred to use a mole ratio of from 6 to 7 to obtain best results.

Promotion of the aluminum chloride catalyst is accomplished through introduction of anhydrous hydrogen chloride into the reactor in an amount equal to approximately from 5 to 10 percent by weight of the catalyst employed. An alternative method depends upon the reaction of water and aluminum chloride, and if desired, the required amount of hydrogen chloride can be produced in the slurry tank as a result of water present in the aromatic hydrocarbon, or water can be introduced into the reactor. This method is not, however, preferred in view of the difficulties involved in determining and controlling the quantity of water present in the system.

I have found that the reaction proceeds most efficiently with least by-product formation at a temperature of between 60° F. and 130° F. and preferably at a temperature of about 90° F. Since the reaction involved is exothermic, a heat exchanger 19 is provided in order to maintain the reaction temperature within the specified range.

The reactor is furnished with an agitator 20, driven by any appropriate means such as a motor 21, in order to maintain the circulation velocities which have been found essential to improved results. I have discovered that in order to obtain maximum dodecylbenzene yield for given quantities of reactants and catalyst, the ratio of reactants circulation rate to the rate of introduction of fresh feed into the reactor must be at least 100 and should preferably be about 150. In other words, as indicated on the drawing, the ratio of the rate of reactant circulation R past the surface of the heat exchanger 19 to the rate of flow $R_1$ of the catalyst slurry plus the rate of flow $R_2$ of the dodecene should be at least 100. Although conventional processes for preparation of dodecylbenzene have employed agitation in the reactor vessel, until my invention there has been no recognition of the criticality of the foregoing ratio in the conjunction with continuous and simultaneous introduction of the catalyst and reactants into the reaction zone and the temperature range set forth. Consequently, as the reactants locally contacted the catalyst, localized areas of above operative temperature occurred with a concomitant excess of by-product formation. However, the effects of wide temperature variance within the reactor are not solely responsible for inefficiencies in conventional processes. Unless the ratios recited are maintained, there is insufficient surface contact between the catalyst and the reactants to promote the reaction under optimum conditions. In addition to the above temperature and circulation-feed ratio, it is also important to limit the residence time of reactants within the reactor to from 3 to 20 minutes and preferably to maintain it at approximately 10 minutes.

The reaction effluent is continuously withdrawn through pipe 22 and introduced to the separator 23 where the catalyst sludge is removed through the outlet line 24. The resulting substantially catalyst free effluent is pumped through the line 25 into an acid treater 26 and then through pipe 27 into a caustic soda treater 28 where it is successively treated with sulfuric acid and then with caustic soda solution. The effluent is subsequently admitted, through the pipe 29 to a fractionator 30 operated at atmospheric pressure for the distillation of a moist aromatic hydrocarbon which is subsequently eliminated through line 31 and distilled in fractionator 32 to separate the water from the aromatic which is then recycled into the system through pipe 33.

The product stream is received, through the pipe 34 by fractionator 35 which is operated under reduced pressure to eliminate the light alkyl aryl fraction which is continuously withdrawn through pipe 36. The fractionator bottoms are pumped to a second fractionator 37 through the pipe 38. This tower is operated at pressures lower than the first fractionator and the desired alkyl aryl hydrocarbon product, dodecylbenzene, is obtained as an overhead product through pipe 39 while a heavy alkyl aryl hydrocarbon is removed through line 40.

The dodecylbenzene resulting from practice of my process can then be sulfonated in keeping with familiar methods to give the desired detergent.

In order to compare the results obtained through use of the concepts above disclosed, with those ensuing from practice of known methods, test quantities of benzene were alkylated with dodecene in accordance with the preferred conditions of my invention and a conventional batch process was run under its known optimum conditions with the following results:

|  | Batch | Continuous |
|---|---|---|
| Dodecene required, lb./lb. product | 1.080 | 0.956 |
| Benzene required, lb./lb. product | 0.504 | 0.488 |
| Light alkylaromatic formed, lb./lb. product | 0.262 | 0.225 |
| Heavy alkylaromatic formed, lb./lb. product | 0.192 | 0.152 |
| Unsulfonated oil, percent based on 100% active sodium sulfonate | 1.2–1.35 | 0.9–1.1 |

Since dodecylbenzene is most commonly used in the preparation of detergents, my invention has been disclosed with reference to a process for manufacture of that product although it will be apparent that it may be equally advantageously employed to prepare other alkyl aryl hydrocarbons. For example, toluene, naphthalene, anthracene, phenanthrene and xylene are exemplary but not limitative of the aromatic hydrocarbons, and octene, pentadecene and nonene are similarly exemplary but not limitative of the long chain olefins which are suitable for use in my process.

It will be evident that various minor modifications can be made in the process divulged without departing from the concepts of my invention.

I claim:

1. A process for manufacturing dodecylbenzene which comprises continuously and concurrently introducing to a reactor dodecene and a hydrogen chloride promoted aluminum chloride-benzene slurry, the quantity of said aluminum chloride and said hydrogen chloride being respectively equal to about 2.6 percent by weight of the dodecene and about 5 percent by weight of the aluminum chloride, the molar ratio of benzene to dodecene being from about 6 to 7, maintaining circulation rate of reactants within said reactor, at a temperature of about 90° F., such that the ratio of the circulation rate of the reactants to the sum of the rates of introduction of said reactants is about 150, maintaining the rate of flow of reactants into the effluent from said reactor such that the average residence time therein is about 10 minutes, separating spent catalyst from reactor effluent, separating excess benzene therefrom and fractionating the thus purified effluent to recover a light alkyl aryl hydrocarbon fraction, a heavy alkyl aryl hydrocarbon fraction, and dodecylbenzene.

2. A process for manufacturing an alkyl aryl hydrocarbon which comprises simultaneously and continuously adding to an agitator-equipped reactor a high molecular weight long chain olefin and a hydrogen chloride promoted aluminum chloride-aromatic hydrocarbon slurry, said aluminum chloride being present in an amount equal to from 2.5 to 6.0 percent by weight of said olefin and said aromatic hydrocarbon being present in a molecular ratio to olefin of from 3 to 20, maintaining a circulation rate of reactants within said reactor, at a temperature of from 60° F. to 130° F., such that the ratio of the circulation rate of the reactants to the sum of the rates of introduction of said reactants is at least 100, separating spent catalyst from reactor effluent, separating excess aromatic hydrocarbon therefrom and fractionating the thus purified effluent to recover a light alkyl aryl hydrocarbon fraction, a heavy alkyl aryl hydrocarbon fraction, and an alkyl aryl hydrocarbon product.

3. The process of claim 2 in which the aromatic hydrocarbon is benzene and the olefin is dodecene.

4. The process of claim 3 further characterized in that the defined circulation rate of reactants within the reactor is maintained at about 150.

5. The process of claim 4 further characterized in that the rate of flow of reactants into the reactor and the rate of flow of effluent therefrom are maintained such that the average residence time of reactants within the reactor is from 3 to 20 minutes.

6. The process of claim 2 in which the aluminum chloride is retained in particles of at least ⅛ inch in size and is admixed with the aromatic hydrocarbon immediately after crushing in a moisture-free atmosphere to granules no larger than 10 mesh in size.

7. The process of claim 1 in which the aluminum chloride is retained in particles of at least ⅛ inch in size and is admixed with the aromatic hydrocarbon immediately after crushing in a moisture-free atmosphere to granules no larger than 10 mesh in size.

References Cited in the file of this patent

UNITED STATES PATENTS

| 2,238,802 | Altushuler et al. | Apr. 15, 1941 |
| 2,437,356 | Hill | Mar. 9, 1948 |
| 2,454,869 | Goldsby | Nov. 30, 1948 |
| 2,520,439 | Sailors | Aug. 29, 1950 |
| 2,667,519 | Paltz | Jan. 26, 1954 |

FOREIGN PATENTS

| 724,127 | Great Britain | Feb. 16, 1955 |